Oct. 14, 1947.　　　F. CONTRASTANO　　　2,429,015
BUTTONHOLE GAUGE
Filed Oct. 24, 1944　　　2 Sheets-Sheet 1

Inventor
F. Contrastano
By Robb & Robb
Attorneys

Oct. 14, 1947.  F. CONTRASTANO  2,429,015
BUTTONHOLE GAUGE
Filed Oct. 24, 1944  2 Sheets-Sheet 2
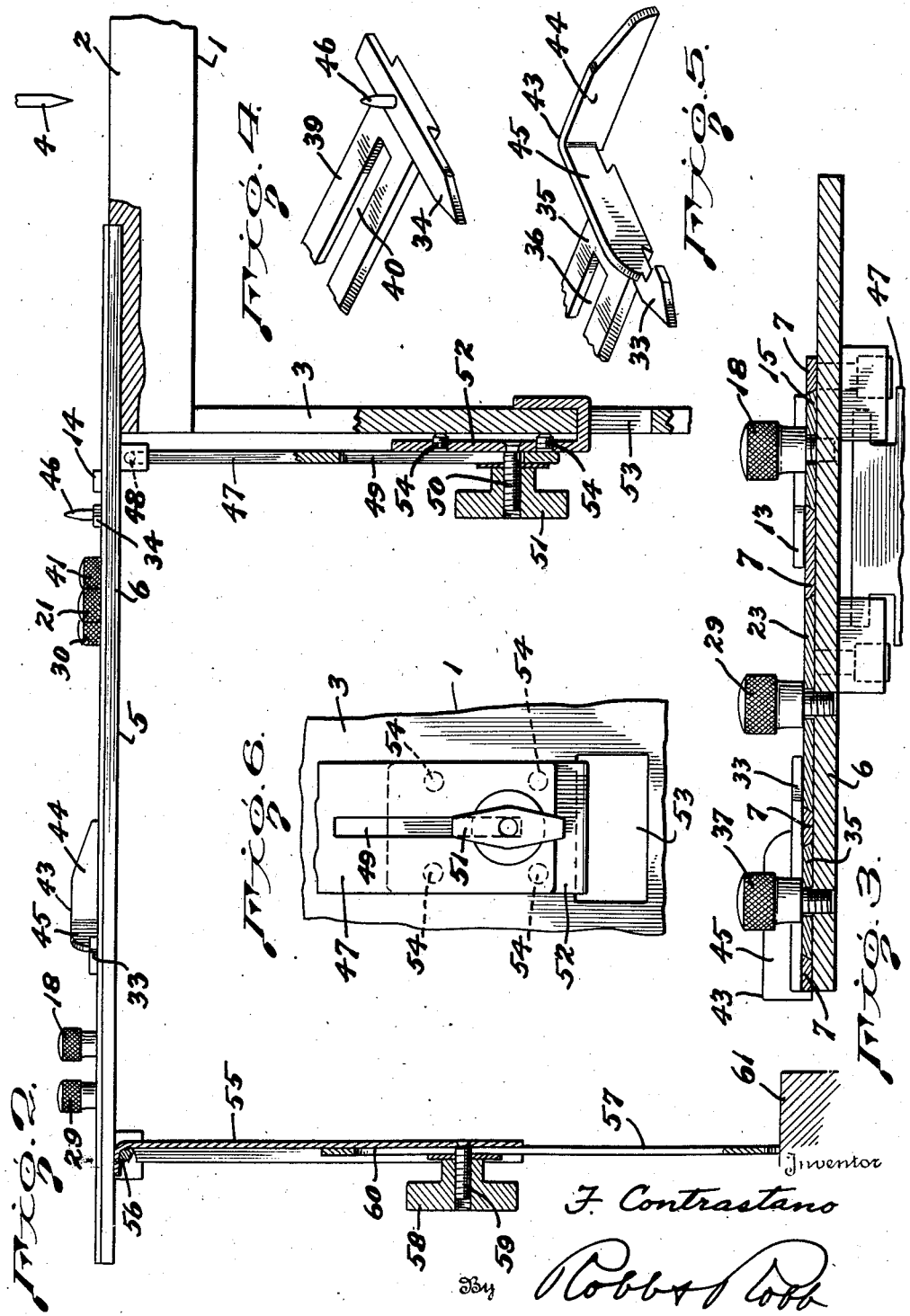
Inventor
F. Contrastano
By Robb & Robb
Attorneys Patented Oct. 14, 1947

2,429,015

UNITED STATES PATENT OFFICE 2,429,015

BUTTONHOLE GAUGE

Fedele Contrastano, Syracuse, N. Y.

Application October 24, 1944, Serial No. 560,153

3 Claims. (Cl. 33—190)

This invention relates to instrumentalities for determining the position of buttonholes to be cut in fabrics and garments, and more especially to an improved buttonhole gauge having the form of an attachment for conventional buttonhole cutting machines, whereby the fabrics, or the garments, as the case may be, may be accurately positioned with relation to the cutting device so as to enable the buttonholes to be cut by the machine without preliminary marking of the fabrics or garments.

In the manufacture of garments, such as suit coats, vests, trousers, overcoats and the like, it is still common practice to mark the position of the buttonholes before they are cut, the marking being performed by hand, as in the use of chalk marks, pins, threads, and the like. This marking operation obviously increases the production cost of the garments and limits the output of the manufacturing plant in proportion to the number of markers employed. Moreover, mistakes in marking are frequent, and give rise to undue waste of time and materials.

It is the primary object of the present invention to provide a buttonhole gauge which will accurately determine the position of the buttonholes directly, without any preliminary marking.

A further object is to provide a gauge of the aforementioned character which accurately and adjustably determines the spacing of the buttonholes with relation to each other, according to the style, size, and nature of the garments.

Another object of the invention is to provide an adjustable buttonhole gauge which is simple and compact in form and which may be conveniently adjusted for use with garments of different styles, models, and sizes. Due to the simplicity of the gauge, no particular skill is required in the use thereof, thus making it possible for the operator of a conventional buttonhole cutting machine to employ the gauge with complete assurance of accuracy, and without undue expenditure of time and effort.

Other and further objects and advantages of the invention will be hereinafter described and the novel features thereof defined by the appended claims.

In the drawings:

Figure 1 is a top plan view of my improved buttonhole gauge, as applied to a conventional buttonhole cutting machine, the gauge being of a form that is particularly adapted for use in gauging buttonholes in suit coats and the like;

Figure 2 is a view in side elevation, with portions of the work-table of the machine and the supports for the gauge shown in section;

Figure 3 is a transverse section through the gauge, taken on the line 3—3 of Figure 1;

Figure 4 is a fragmentary perspective view of one of the adjustable indicators which serves to determine the spacing of the buttonholes relative to each other;

Figure 5 is a fragmentary perspective view of another of the adjustable indicators which determines the distance of the first buttonhole from an edge or other reference point of the garment;

Figure 6 is a view in end elevation of one of the adjustable supports by means of which the gauge may be attached to the frame of the buttonhole cutting machine;

Figure 7 is a fragmentary diagrammatic view in top plan, illustrating the use of the gauge in correctly positioning a suit coat relative to the cutter or knife of the buttonhole cutting machine, for cutting of the first buttonhole, as determined by the setting of the gauge for the particular style and size of the garment; and Figure 8 is a view generally similar to Figure 7, showing the use of the gauge for positioning the garment preparatory to cutting another buttonhole at a predetermined distance from the first, according to the setting of the gauge.

Like reference characters designate corresponding parts in the several figures of the drawings, wherein I generally denotes a conventional buttonhole making machine of any suitable type, such as is commonly employed for making a series of buttonholes along an edge of garments or the like. The buttonhole machine has been shown more or less diagrammatically, inasmuch as the details thereof are not important to this invention, and it is to be understood that the invention is not limited to any single type of machine. The machine includes a work-table or base 2 supported at a suitable elevation by a frame 3. A cutter member or knife 4 is mounted for reciprocating movement in a vertical direction, towards and away from the work-table 2, and beneath which the fabric or garment in which the buttonholes are to be cut is positioned, so that the buttonholes will be cut by the knife 4 on its downward movement. Stitching mechanism (not shown) may also be associated with the knife 4, if desired, to finish the edges of the buttonhole, or the finishing operation may be performed separately if preferred.

My improved buttonhole gauge is generally designated 5 and comprises a flat plate 6 which may be attached to the buttonhole machine I so as to lie in a substantially horizontal position, with the plate extended to one side of the cutter member 4 at an elevation corresponding to that of the work-table 2 so as to form a continuation of the latter. The plate 6 forms the base of the gauge, and is provided on its upper surface with a plurality of guides 7 extending longitudinally thereof and forming ways or channels 8, 9 and 10, respectively, therebetween. One of the guides 7 is graduated along one edge to provide two scales 11 and 12 respectively, the former representing progressively increasing distances from the cutter member or knife 4 to a predetermined reference point on the garment, such as the lapel notch of a suit coat, from which the distance of the first buttonhole is measured. This distance will vary according to the model or style of the garment, that is, long, regular, short, etc., and in addition, according to the variations of the same styles adopted by different manufacturers. The second scale 12 likewise represents progressively decreasing distances from the cutter member or knife 4 to another buttonhole of the garment, so that it is a measure of the distance between buttonholes, which likewise varies in accordance with the style or model of the garment. The two scales above referred to respectively increase in opposite directions from an intermediate position along the gauge towards the opposite ends thereof. Associated with the respective fixed scales 11, 12 are indicator members 13 and 14, each of which is carried by a slide, designated 15 and 16 respectively, disposed in the channel 8 for adjustable sliding movements in opposite directions, towards and away from the knife 4. The slide 15 is provided with an elongated slot 17 through which extends a clamping screw 18, which may be selectively engaged with a series of threaded openings 19 provided in the base 6, so that the indicator 13 may be set to register with any selected graduation of the scale 11.

Similarly, the slide 16 is slotted at 20, and a clamping screw 21 is selectively engageable with another group of openings 22 provided in the base 6, so that the indicator 14 may be set to register with any selected graduation of the scale 12.

Disposed in the channel 9 is a pair of movable scale members designated 23 and 24 respectively, these members being suitably graduated at 25 and 26, with the graduations preferably extending from side to side of the slidable scale members. These movable scale members are each slotted at 27 and 28 to receive clamping screws 29 and 30 which are selectively engageable in the threaded openings 31 and 32 to permit adjustment of the movable scale members relative to the fixed scales 11 and 12, as will be obvious.

Another set of indicators is slidably mounted in the channel 10 for cooperation with the graduations of the slidable scales 23 and 24, the indicators being respectively designated 33 and 34. Indicator 33 is carried by a slide 35 which is slotted at 36 to receive the clamping screw 37 which is selectively engageable in the openings 38. Similarly, indicator 34 is carried by a slide 39 which is slotted at 40 for receiving a clamping screw 41 which is selectively engageable in the openings 42.

Associated with the indicator 33 and fixed to the slide 35 is an abutment or stop member 43, which comprises an angular plate extending upwardly from the gauge, with a portion of the plate lying parallel to the edge of the base 6, as indicated at 44, and another portion extending generally transversely therefrom, towards the movable scale 23, as indicated at 45.

Associated with the indicator 34 is a stop member 46 which preferably has the form of an upright pin.

The gauge is attached to the buttonhole machine 1 in any suitable manner, according to the particular construction of the machine with which it is used. By way of example, the attachment may be made in the manner illustrated in Figures 2 and 6 of the drawings, wherein 47 designates a supporting standard extending downwardly from the bottom of the base plate 6 and hingedly connected thereto at 48. The lower end of the standard is slotted at 49 to receive a clamping screw 50 which extends therethrough and is threadedly engaged at its outer end with a clamping nut 51. The inner end of the clamping screw 50 is fixed to an L-shaped bracket 52, the lower end of which may be passed through an opening 53 in the frame 3 of the buttonhole machine 1, and then clamped to the frame by the set screws 54.

Spaced from the standard 47 and positioned adjacent to the outer end of the gauge is a second standard 55 which is hingedly connected to the base plate 6 at its upper end, as indicated at 56. The lower end of the standard 55 is provided with an adjustable extension 57, the adjustment being effected by the clamping nut 58 on the outer end of the clamping screw 59, which extends through a slot 60 in the extension 57, and is fixed at its inner end to the standard 55. The lower end of the extension 57 may be rested upon a suitable support 61, such as a bench or other support on which the buttonhole machine is mounted when in use.

The use of the gauge is diagrammatically illustrated in Figures 7 and 8, and will be briefly described as follows. In making a series of buttonholes in a suit coat or the like, the indicator 13 is first set in relation to the fixed scale 11, according to the particular style or model of the garment. After clamping the indicator 13 in its set position, by means of the clamping screw 18, the movable scale member 23 is then set with its innermost graduation registered with the indicator 13, whereupon the movable scale member is clamped in position by the clamping screw 29. The indicator 33 is next set to register with a selected graduation on the movable scale 23, which graduations represent garment sizes. Inasmuch as there is so little difference in the position of the buttonholes of garments differing in a single size, each graduation of the scale 25 may represent at least two sizes, as indicated by the double row of figures designated 62.

The indicators 14 and 34, and the associated movable scale member 24 are correspondingly set to correspond with the style or model of the garment and the size. Thereafter, the garment is placed in the position illustrated in Figure 7, with the lapel notch of the coat abutting the stop member 43. When so positioned, the garment is correctly positioned for cutting of the first buttonhole pursuant to the downward movement of the knife 4. As the next step, in the operation of making a series of buttonholes in the garment, the garment is shifted to bring the first buttonhole into engagement with the stop pin 46, as indicated in Figure 7, which automatically positions the garment for cutting the next buttonhole by means of the knife 4. Succeeding buttonholes may thereafter be cut by progressively moving the garment to bring the last buttonhole into engagement with the pin 46. By suitably adjusting the indicators and movable scale members, the distance from the lapel notch to the first buttonhole, and the distances between succeeding buttonholes may be varied to suit any particular style or model and size of the garment.

In the case of double-breasted suits, vests, and the like, the bottom edge of the garment may be used as the reference point in lieu of the lapel notch previously referred to, in which event, the buttonholes will be automatically located and cut in successive steps from the bottom of the garment upwardly.

Other changes and adaptations of the invention may be made without departing from the spirit thereof as defined by the appended claims.

I claim:

1. A buttonhole gauge for use with buttonhole machines including a horizontal work surface and a vertically movable cutter member reciprocable towards and away from said work surface, said gauge comprising a substantially flat base member adapted to be attached to the buttonhole machine in a horizontal position at one side of the cutter member aforesaid, a fixed graduated scale on said base member, with the graduation lines thereof progressively increasing in distance from the cutter member, a movable scale member adjustably mounted on the base for movement towards and away from the cutter member and relative to the fixed scale, and a stop member movably mounted on the base member and also adjustable towards and away from the cutter member and relative to the movable scale member.

2. A buttonhole gauge, comprising a substantially flat base member, a movable scale member adjustable longitudinally on said base member, said scale member being graduated along at least one edge thereof into units representing garment sizes, with the graduation lines of the scale extended generally transversely to the direction of movement of the scale member, movable stop means also adjustable longitudinally on said base member for selective cooperation with the graduation lines on said movable scale member, and said base member being provided with indicia representing garment styles arranged in juxtaposition to the graduation lines of the adjustable scale member and constituting points of reference with which any one of the respective graduation lines of the adjustable scale member are adapted to be coordinated.

3. A buttonhole gauge, comprising a substantially flat base member, a movable scale member adjustable longitudinally on said base member, said scale member being graduated along at least one edge thereof into units representing sizes, with the graduation lines of the scale extended generally transversely to the direction of movement of the scale member, movable stop means also adjustable longitudinally on said base member for selective cooperation with the graduation lines on said movable scale member, said base member being provided with indicia representing garment styles arranged in juxtaposition to the graduation lines of the adjustable scale member and constituting points of reference with which any one of the respective graduation lines of the adjustable scale member are adapted to be coordinated, and an adjustable indicator member cooperating with the style indicia for selectively indicating the point of reference with which the adjustable scale member is to be coordinated for a particular garment.

FEDELE CONTRASTANO.

REFERENCES CITED

The following references are of record in the file of this patent:

FOREIGN PATENTS

| Number | Country | Date |
| --- | --- | --- |
| 13,109 | Great Britain | 1889 |